(12) United States Patent
Park et al.

(10) Patent No.: US 7,509,426 B2
(45) Date of Patent: Mar. 24, 2009

(54) SYSTEM FOR ABORTING WEB SERVICES AUTOMATICALLY AND METHOD THEREOF

(75) Inventors: Chan Kyu Park, Daejeon (KR); Daeha Lee, Daejeon (KR); Jin Young Moon, Daegu (KR); Byoung Youl Song, Daejeon (KR); Rockwon Kim, Daejeon (KR); Seung Woo Jung, Daejeon (KR); Hyun Kyu Cho, Daejeon (KR); Ho Sang Ham, Daejeon (KR); Yoon Joon Lee, Daejeon (KR); Jungsook Kim, Daejeon (KR); Seunglak Choi, Daejeon (KR); Hyukjae Jang, Daejeon (KR); Hangkyu Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 739 days.

(21) Appl. No.: 10/990,928

(22) Filed: Nov. 16, 2004

(65) Prior Publication Data

US 2005/0144301 A1    Jun. 30, 2005

(30) Foreign Application Priority Data

Dec. 26, 2003  (KR) ...................... 10-2003-0097818

(51) Int. Cl.
*G06F 15/16* (2006.01)
(52) U.S. Cl. .................. 709/227; 707/200; 707/201; 707/202; 714/15; 714/40
(58) Field of Classification Search ................ 709/227; 714/15, 40; 707/200–202
See application file for complete search history.

(56) References Cited

U.S. PATENT DOCUMENTS 5,875,291 A * 2/1999 Fox ............................. 714/15
6,012,094 A * 1/2000 Leymann et al. ............ 709/230

(Continued)

FOREIGN PATENT DOCUMENTS

KR        2001-0013112         2/2001

OTHER PUBLICATIONS

Felipe Cabrera et al., "Web Services Transaction (WS-Transaction)," Aug. 9, 2002, EBM developer Words: Web servicess: Web services articles, developer Works (25 pp.).

(Continued)

*Primary Examiner*—Phuoc Nguyen
(74) *Attorney, Agent, or Firm*—Blakely, Sokoloff, Taylor & Zafman LLP (57) ABSTRACT

A system and method for aborting web services automatically. An application program container has a first web service application program embedded, intercepts a message that is transmitted and received between a second web service program located externally and the first web service application program, identifies the kind of an operation requested by the second web service application program, and keeps information required for compensation. A protocol manager generates and manages a first sub-transaction object by a request of the second web service application program. A local compensator compensates the first sub-transaction if a global transaction coordinator sends a command to compensate a second sub-transaction already committed. A protocol service unit transmits and receives messages for managing the first sub-transaction. A registration service unit registers the generated first sub-transaction with the global transaction coordinator.

8 Claims, 5 Drawing Sheets

U.S. PATENT DOCUMENTS

| | | | | |
|---|---|---|---|---|
| 6,233,585 | B1 * | 5/2001 | Gupta et al. | 707/103 R |
| 6,526,416 | B1 * | 2/2003 | Long | 707/202 |
| 6,983,395 | B2 * | 1/2006 | Chen et al. | 714/4 |
| 7,206,805 | B1 * | 4/2007 | McLaughlin, Jr. | 709/203 |
| 7,277,900 | B1 * | 10/2007 | Ganesh et al. | 707/202 |
| 7,281,153 | B2 * | 10/2007 | Bretschneider et al. | 714/2 |
| 2003/0046258 | A1 * | 3/2003 | Candee et al. | 707/1 |

OTHER PUBLICATIONS

M. Chessell et al., "Extending the Concept of Transaction Compensation," IBM Systems Journal, vol. 41, No. 4, 2002, (pp. 743-758).

Thomas Mikalsen et al., "Transactional Attitudes: Reliable Composition of Autonomous Web Services," IBM T.J. Watson Research Center, Hawthorne, New York, USA (10 pp.).

Organization for the Advancement of Structured Information Systems, "Business Transaction Protocol," Oasis BTP Committee Specification, 1.0, Jun. 3, 2002, (pp. 1-188).

"Efficient Method of Processing Long-term Transactions for Distributed Environment" by Jee-Ho Jung et al.; *Korean Oceanic Information Communications Socity Paper*, vol. 7 and No. 7; Dec. 4, 2003; pp. 1498-1508.

* cited by examiner

| Type | originTokenID | intermediaryId | intermediaryAddr |

SYSTEM FOR ABORTING WEB SERVICES AUTOMATICALLY AND METHOD THEREOF

BACKGROUND OF THE INVENTION

This application claims the priority of Korean Patent Application No. 2003-97818, filed on Dec. 26, 2003, in the Korean Intellectual Property Office, the disclosure of which is incorporated herein in its entirety by reference.

1. Field of the Invention

The present invention relates to a system for aborting web services automatically and a method thereof, and more particularly, to a system and method for aborting transactions being performed based on web services for intra-organization or inter-organization application integration.

2. Description of the Related Art

Web service is a technology proposed for integration of applications inside an organization or between organizations. Demands for transactions performed across a plurality of organizations based on web service have been increasing. WS-Transaction and BTP have suggested protocols to process transactions. A web service transaction (hereinafter, referred to as "global transaction") is formed with at least one or more sub-transactions. Each of the sub-transactions is performed in a participant installed in each organization.

When performing a sub-transaction is finished, a commit operation is immediately performed. If another sub-transaction in the same global transaction is failed, the global transaction is stopped to guarantee atomicity of the global transaction. At this time, by compensating the sub-transaction already committed, the previous state should be recovered. Meanwhile, by compensating a predetermined sub-transaction, compensation of a sub-transaction belonging to another global transaction may be requested. For example, if sub-transaction $ST_1$ reads data updated by sub-transaction $ST_2$ belonging to another global transaction, then when $ST_2$ is compensated, $ST_1$ should also be compensated. This is because sub-transaction $ST_1$ read the data before sub-transaction $ST_2$ is canceled. However, the conventional technologies related to web services do not address this situation.

SUMMARY OF THE INVENTION

The present invention provides a system and method for aborting web services automatically by which the inconvenience that an application programmer should program continuous compensation operations one by one can be removed, and in order to perform continuous aborts, a global transaction coordinator keeps information on only a global transaction in a direct dependency relation with the global transaction coordinator.

According to an aspect of the present invention, there is provided a system for aborting web service transactions automatically including: an application program container which has a first web service application program embedded, intercepts a message that is transmitted and received between a second web service program located externally and the first web service application program, identifies the kind of an operation requested by the second web service application program, and keeps information required for compensation; a protocol manager which generates and manages a first sub-transaction object by a request of the second web service application program; a local compensator which compensates the first sub-transaction if a global transaction coordinator that coordinates the state and success factor of a global transaction which is an upper-layer transaction of the generated first sub-transaction sends a command to compensate a second sub-transaction already committed; a protocol service unit which transmits and receives messages for managing the first sub-transaction by communicating with the global transaction coordinator; and a registration service unit which registers the generated first sub-transaction with the global transaction coordinator.

According to another aspect of the present invention, there is provided a system for aborting web service transactions automatically including: a global transaction active service unit which receives a request to generate a new global transaction object, from a first web service application program; a global transaction manager which generates a global transaction object requested by the first web service application program, changes the state of a global transaction based on the state changes of sub-transactions, and determines whether to commit or abort the global transaction; a sub-transaction registration service unit which receives a request from a participant containing a second web service application program performing a sub-transaction, to register the sub-transaction as a lower-layer transaction of the global transaction; a global transaction coordination service unit which receives the state of a sub-transaction being perform in the participant, from the participant and transfer the state; a sub-transaction administration manager which generates a sub-transaction object corresponding to a sub-transaction whose registration is requested by the participant through the sub-transaction registration service unit, registers the generated sub-transaction object with a global transaction object through the global transaction manager, extracts global transaction identification information and sub-transaction identification information based on a message received from the global transaction coordination service unit, retrieves a sub-transaction corresponding to the extracted sub-transaction identification information, and changes the state of the sub-transaction; an entire transaction manager which stores information on dependency between global transactions, and manages an entire transaction; and a dependency service unit which communicate with the participant and receives dependency information of a global transaction.

According to still another aspect of the present invention, there is provided a method for aborting web service transactions automatically including: receiving a coordination context from a web service application program located externally; generating a first sub-transaction object based on the coordination context; registering the generated first sub-transaction object with a global transaction coordinator which coordinates the state and success factor of a global transaction that is an upper-layer transaction of the first sub-transaction; and if the global transaction coordinator commands compensation of a second sub-transaction already committed, compensating the first sub-transaction.

According to yet still another aspect of the present invention, there is provided a method for aborting web service transactions automatically including: receiving a request to generate a new global transaction object, from a first web service application program; generating a global transaction object requested by the first web service application program, and transmitting a coordination context to the web service application program; receiving a request from a participant containing a second web service application program performing a sub-transaction, to register the sub-transaction as a lower-layer transaction of the global transaction; generating a sub-transaction object corresponding to a sub-transaction whose registration is requested by the participant; receiving the state of a sub-transaction being perform in the participant, from the participant; based on the state of the sub-transaction being performed in the participant received from the participant, extracting global transaction identification information and sub-transaction identification information, retrieving a sub-transaction corresponding to the extracted sub-transaction identification information, and changing the state of the sub-transaction; and based on the state changes of the sub-transactions, changing the state of the global transaction and determining whether to commit or abort the global transaction.

According to the system and method, in order to perform continuous aborts, a global transaction coordinator keeps information on only a global transaction having a direct dependency with the global transaction coordinator such that business information of a predetermined company can be protected from possible exposure to other companies having no direct relations with the company. In addition, a unified interface between a global transaction coordinator and participants is provided such that all global transaction coordinators and participants implementing this interface can always be integrated to a system for automatically performing continuous aborts.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
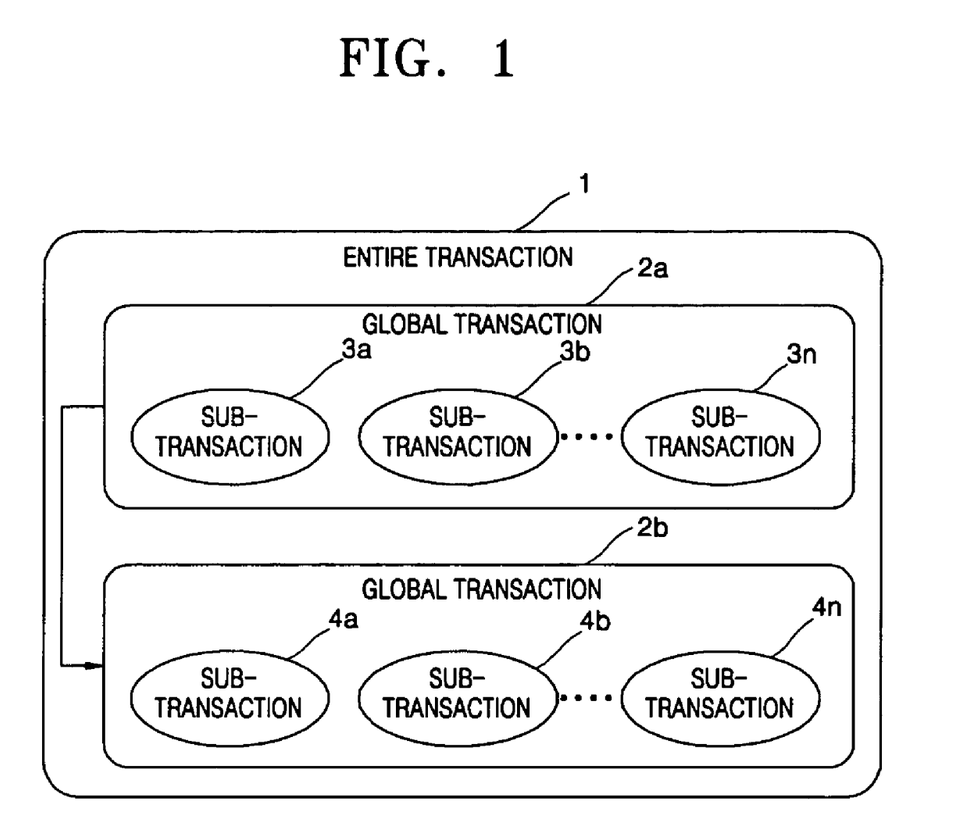
FIG. 1 is a diagram showing the hierarchy of transactions and their correlations.

Referring to FIG. 1, an entire transaction 1 is formed with a plurality of global transactions 2*a* and 2*b*, each of which is formed with a plurality of sub-transactions 3A through 3N and 4A through 4N.

In order to improve the transaction performance, each global transaction 2A and 2B makes each of sub-transactions 3A through 3N and 4A through 4N determine whether or not the sub-transaction is successful, and then of all sub-transaction performs commit operations, then the global transaction is committed. If part of the sub-transactions 3A through 3N and 4A through 4N are failed, the sub-transactions already committed are reverted through compensation to the process before the transactions are performed. Also, sub-transactions being performed are reverted through abort to the process before the transactions are performed. Sub-transactions that do not begin to be performed are cancelled such that the global transaction is reverted to the state before the global transaction is performed. This series of processes caused by failure of part of sub-transactions is referred to as "abort".

Meanwhile, a dominant global transaction is a global transaction when compensation of a sub-transaction of the global transaction causes compensation of other sub-transactions belonging to other global transactions to causes continuous aborts. A global transaction in which continuous aborts are caused by a dominant global transaction is referred to as a dependent global transaction. The relation between a dominant global transaction and a dependent global transaction can occur continuously such that a dependent global transaction can be a dominant global transaction of another global transaction.

Figure 2:
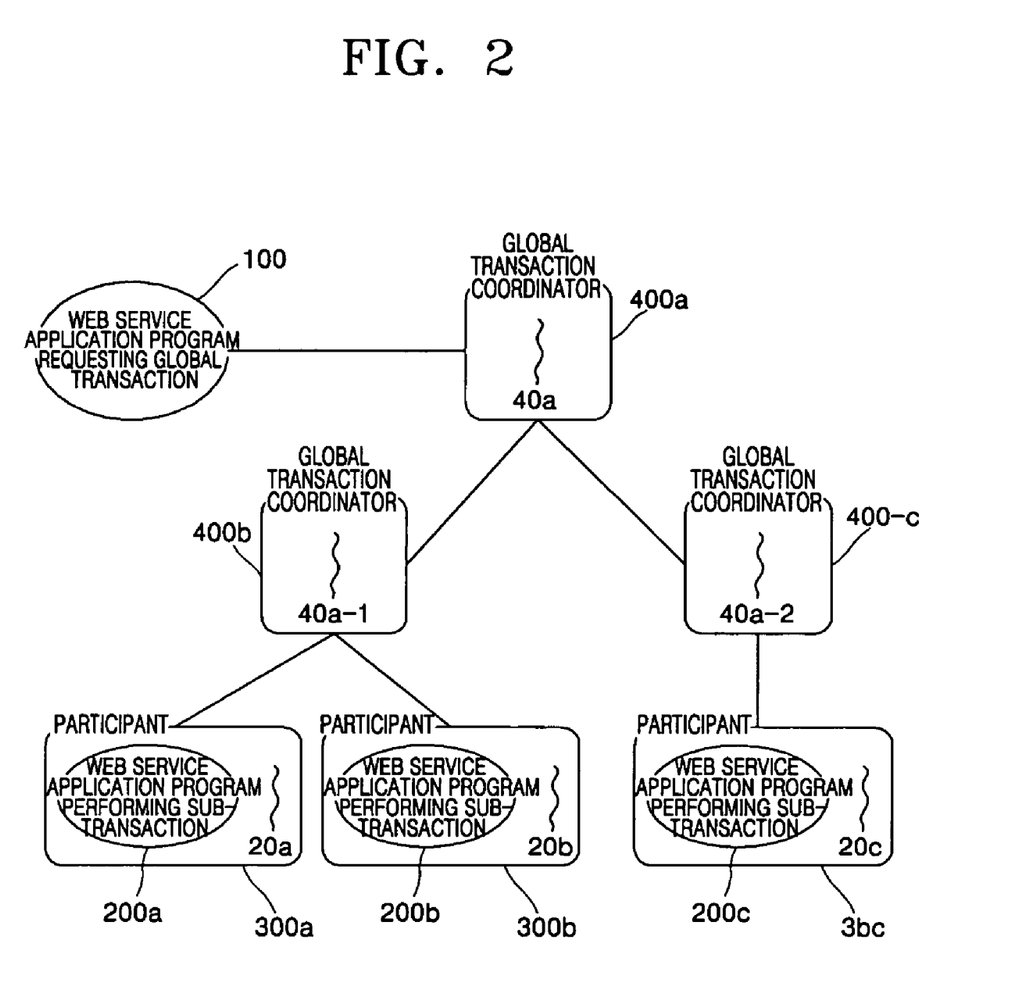
FIG. 2 is a diagram showing the structure of a preferred embodiment of a system for aborting web services automatically according to the present invention.

FIG. 2 is a diagram showing the structure of a preferred embodiment of a system for aborting web services automatically according to the present invention. The embodiment shown in FIG. 2 is of a system having a structure for web service application programs to perform global transactions when overlapped compensations do not occur.

Referring to FIG. 2, the system for aborting web services automatically according to the present invention includes web service application program unit 100, a plurality of global transaction coordination units 400A through 400C, and a plurality of participants 300A through 300C.

The web service application program unit 100 requests its global transaction coordinator 400A to generate a new global transaction 40A. Participants 300A through 300C keep information for compensation of sub-transactions by packing a plurality of web service application programs 200A through 200C performing sub-transactions belonging to a global transaction. Also, participants 300A through 300C maintain and manage state information of sub-transactions together with the global transaction coordinators 400A through 400C. Global transaction coordinators 400A through 400C are designated and used by individual web service application programs 100A, 200A through 200C, and communicate with each other to coordinate the states and success factor. At this time, two different web service application programs 200A and 200B may share an identical global transaction coordinator 400B, and the global transaction coordinators 400A through 400C may be located at any place on the Internet.

The web service application program unit 100 receives a coordination context from the global transaction as a response to the request for generation of a new global transaction 40A, and then transmits the coordination context to the participants 300A through 300C of web service application programs performing sub-transactions 20A through 20C belonging to the global transaction 40A.

Then, by using information included in the coordination context, the web service application program 100A and the participants 300A through 300C register participation into the global transaction with their respective global transaction coordinators. In this process, each of the global transaction coordinators 400B and 400C generate global transaction objects 40A-1 and 40A-2, and global transactions 40A, 40A-1, and 40A-2 sharing an identical coordination context always maintain the same state information.

If this registration process is successfully finished, communication channels for exchanging messages to coordinate respective sub-transactions are established between the global transaction coordinators 400A through 400C and the participants 300A through 300C. Meanwhile, the global transaction coordinators 400B and 400C of sub-transactions and global transaction coordinator 400A which generated the coordination context should communicate with each other in order to coordinate global transactions. For this, communication channels to coordinate global transactions are established between these global transaction coordinators 400A through 400C. Then, the participants 300A through 300C coordinate performance of sub-transactions through communication with respective global transaction coordinators, and the global transaction coordinators coordinate performance of global transactions through communication with each other.

If one sub-transaction 20A among the three sub-transactions 20A through 20C belonging to the global transaction is committed, the participant 300A managing the sub-transaction 20A informs its global transaction coordinator 400B that the sub-transaction 20A is committed. Then, the global transaction coordinator 400B informs the global transaction coordinator 400A through the communication channel that the sub-transaction 20A is committed. The global transaction coordinator 400A determines by the commitment of the sub-transaction, whether or not to change the state of the global transaction object 40A, and based on the determination result, changes the state of the global transaction object 40A, and then changes the states of the other global transactions 40A-1 and 40A-2 identically. At this time, if during the performance of the predetermined sub-transaction 20B, another sub-transaction 20C fails, the participant 300C of this sub-transaction informs the global transaction coordinator 400C of the failure of the sub-transaction 20C through the communication channel. The global transaction coordinator 400C informs the global transaction coordinator 400A of the failure informed by the participant 300C of the sub-transaction 20C. The global transaction coordinator 400A receiving all information, identifies that the global transaction is failed, and in order to compensate the global transaction, commands the global transaction coordinator 400B to compensate the sub-transaction 20A that is already successful, and to stop performance of the sub-transaction 20B that is still being performed.

If the sub-transaction 20A successfully finishes compensation by using compensation information held by the participant 300A, the participant 300A informs the global transaction coordinator 400A of the successful performance of compensation through the global transaction coordinator 400B. Then, after the sub-transaction 20B is successfully aborted, the participant 300B informs the successful stop to the global transaction coordinator 400A through the global transaction coordinator 400B. If the global transaction is successfully performed through this process, the global transaction coordinator 400A informs the global transaction coordinators 400B and 400C of the successful completion of compensation of the global transaction, and commands to delete information on the global transaction.

Figure 3:
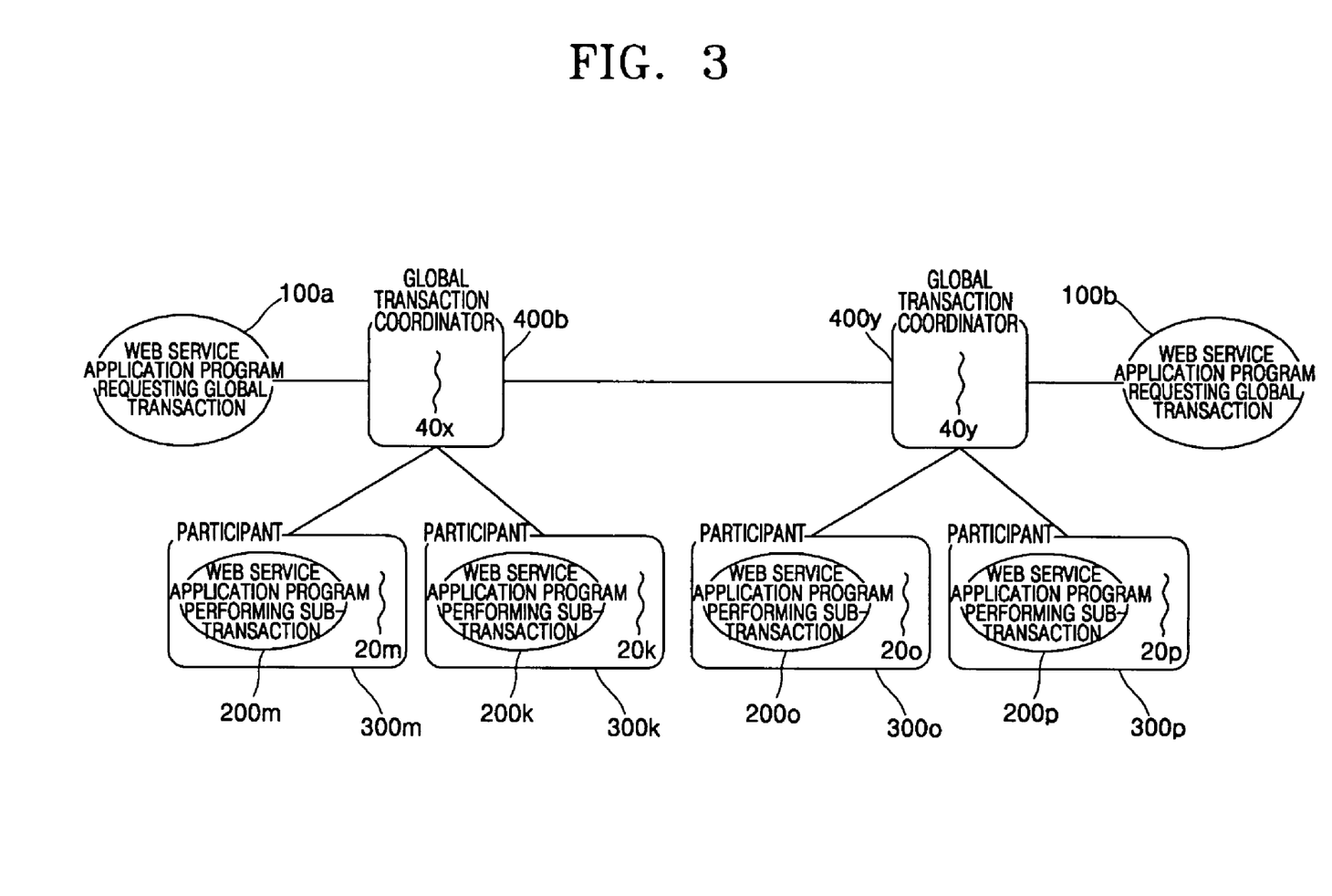
FIG. 3 is a diagram showing the structure of another preferred embodiment of a system for aborting web services automatically according to the present invention.

FIG. 3 is a diagram showing the structure of another preferred embodiment of a system for aborting web services automatically according to the present invention. The embodiment shown in FIG. 2 is of a system having a structure for web service application programs to perform global transactions when overlapped compensations of global transactions occur.

Referring to FIG. 3, in order to perform continuous aborts automatically, in the system for aborting web services automatically according to the present invention, there are two global transactions 40X and 40Y, which are managed by global transaction coordinators 400X and 400Y, respectively. The first global transaction 40X is generated by a first web service application program 100A and includes two sub-transactions 20M and 20N. The second global transaction 40Y is generated by a second web service application 100B and includes three sub-transactions 20N, 20O, and 20P. The two global transaction coordinators 400X and 400Y and the participant 300N communicate with each other to perform continuous aborts.

While the first global transaction 40X performs the sub-transaction 20M, the second global transaction 40Y requests the web service application program 200N, which performs the sub-transaction 20M of the first global transaction, to perform another transaction 20K. In this case, when the sub-transaction 20N being performed and the sub-transaction 20K requested to be performed access an identical item of a database, the participant 300N containing the web service application program 200N recognizes this automatically. Then, the participant 300N containing the web service application program 200N determines that the first global transaction 40X which began performing first, as a dominant global transaction and the second global transaction 40Y which began performing later, as a dependent global transaction. Then, the participant 300N containing the web service application program 200N informs the global transaction coordinator 400Y of the dependent global transaction 40Y, of the ID of the dominant global transaction 40X, the sub-transaction ID of the dominant global transaction which causes the dependency, the address of the global transaction coordinator 400X of the dominant global transaction, the ID of the dependent global transaction 40Y, and the ID of the dependent global transaction which causes the dependency.

Then, the dependent global transaction coordinator 400Y informs the dominant global transaction coordinator 400Y that the dependency has been occurred and transmits a token for checking whether a circular dependency occurs. Meanwhile, if there is a dominant global transaction coordinator to the dominant global transaction coordinator 400X, the dominant global transaction coordinator 400X transmits this token to the dominant global transaction coordinator of the dominant global transaction coordinator 400X. If the token is spread through this process, and then, if the token sent by it is received again by it, the dependent global transaction coordinator 400Y recognizes that a circular dependency occurs, and requests its dominant global transaction coordinator 400X to abort the dominant global transaction 40X. Unlike this, if it is confirmed that there is no circular dependency, the global transaction coordinator 400X of the dominant global transaction generates the global transaction by communicating with the dependent global transaction coordinator 400Y. Then, the global transaction coordinator 400X of the dominant global transaction makes a promise (first promise) to the dependent global transaction coordinator 400Y that in case of aborting the dominant global transaction, the aborting will be informed to the dependent global transaction coordinator 400Y. If the dominant global transaction is aborted, the global transaction coordinator 400X of this global transaction informs the dependent global transaction coordinator of aborting the dominant global transaction. If the dominant transaction 40X is committed after making the first promise, in preparation for possible continuous aborts, the global transaction coordinator 400X commands the coordinator 400Y of the dependent transaction that is not committed, to perform a commit operation.

Meanwhile, in order to protect business information of a global transaction from malicious users, each of all global transaction coordinators 400X and 400Y maintains information on only the global transaction having a direct dependency with the global transaction coordinator. That is, each of all global transaction coordinators 400X and 400Y maintains information on its dependent global transaction dependency information, and on dominant global transaction dependency information, while information on the entire transaction is divided and stored as parts of dependency information maintained by all global transaction coordinators 400X and 400Y, respectively, belonging to the entire transaction.

Figure 4:
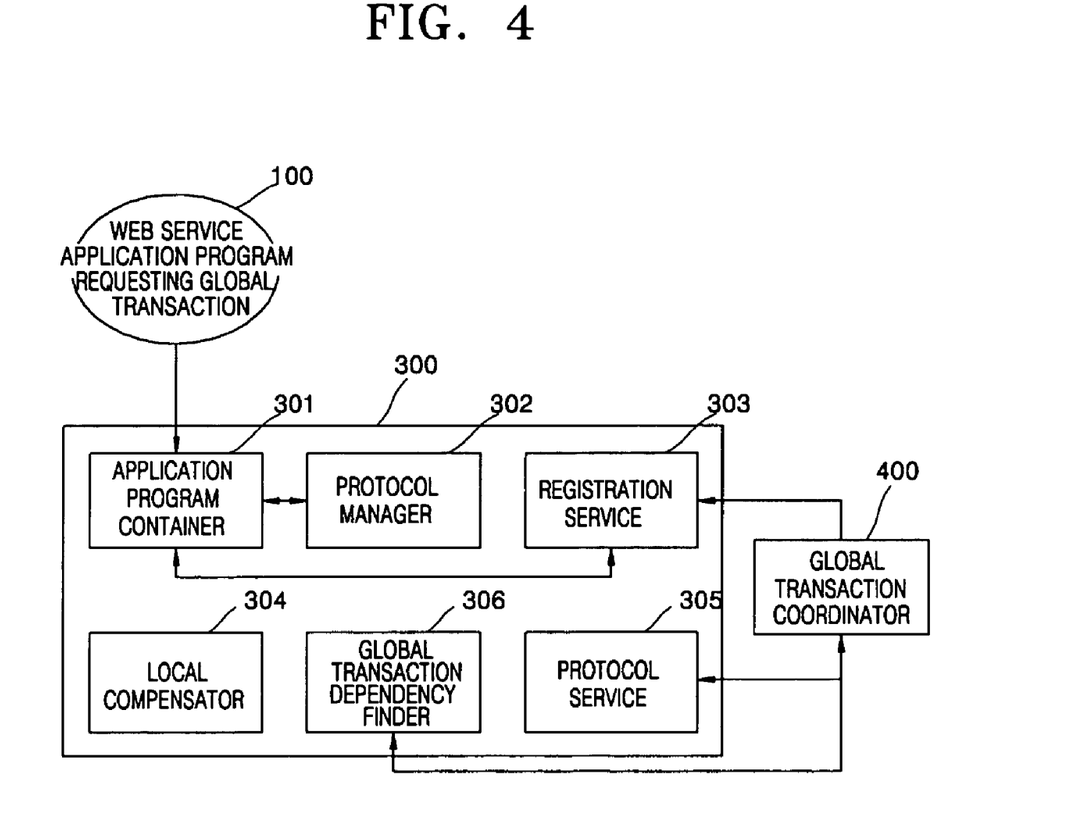
FIG. 4 is a block diagram of a detailed structure of a participant forming a system for aborting web services automatically according to the present invention.

FIG. 4 is a block diagram of a detailed structure of a participant forming a system for aborting web services automatically according to the present invention.

Referring to FIG. 4, the participant 300 is an element which includes a web service application program, and instead of the web service application program performing a sub-transaction, coordinates the success factor and compensation of a sub-transaction together with the global transaction coordinator. The participant 300 includes an application program container 301, a protocol manager 302, a registration service unit 303, a local compensator 304, a protocol service unit 305, and a global transaction dependency finder 306.

The application program container 301 is an element having an embedded web service application program, and intercepts all SOAP message transmitted and received by the web service application program, extracts necessary information, and transfers SOAP message to a corresponding application program. That is, if a first web service application program that is a web service application 100 requesting a global transaction transmits a coordination context to a second web service application program that is a web service application program in the application program container 301, the application program container 301 requests the protocol manager 302 to generate a sub-transaction and registers the generated sub-transaction with the global transaction coordinator 400 through the registration service unit 303. Then, the application program container 301 identifies the kind of an operation of the second web service application program requested by the first web service application program, performs the operation, and then, transmits a response message which the second web service application program sends to the first web service application program, and the kind of the performed operation to the sub-transaction object such that the sub-transaction object can transmit an appropriate transaction coordination message to the global transaction coordinator 400 and information required for compensation can be kept.

The protocol manager 302 generates and manages a sub-transaction object. By using a message received through the protocol service unit 305, the protocol manager 302 coordinates a sub-transaction object together with the global transaction coordinator 400.

The registration service unit 303 is an interface for registering a sub-transaction object generated by the protocol manager 302 with the global transaction coordinator 400, and through a registration process, establishes a communication channel for exchanging message for coordinating the state of the sub-transaction.

The local compensator 304 is a component which when the global transaction coordinator 400 commands it to compensate a committed sub-transaction, automatically compensates the sub-transaction, by extracting information for compensation from the sub-transaction object.

The protocol service unit 305 is an interface for exchanging messages for coordination of the state of the sub-transaction together with the global transaction coordinator 400.

The global transaction dependency finder 306 is a component for determining the dependency between a dominant global transaction and a dependent global transaction. When a dependency between two sub-transactions being performed by the global transaction dependency finder 306 occurs, the global transaction dependency finder 306 finds a dominant global transaction and a dependent global transaction, and informs a dependent global transaction coordinator of the result.

Figure 5:
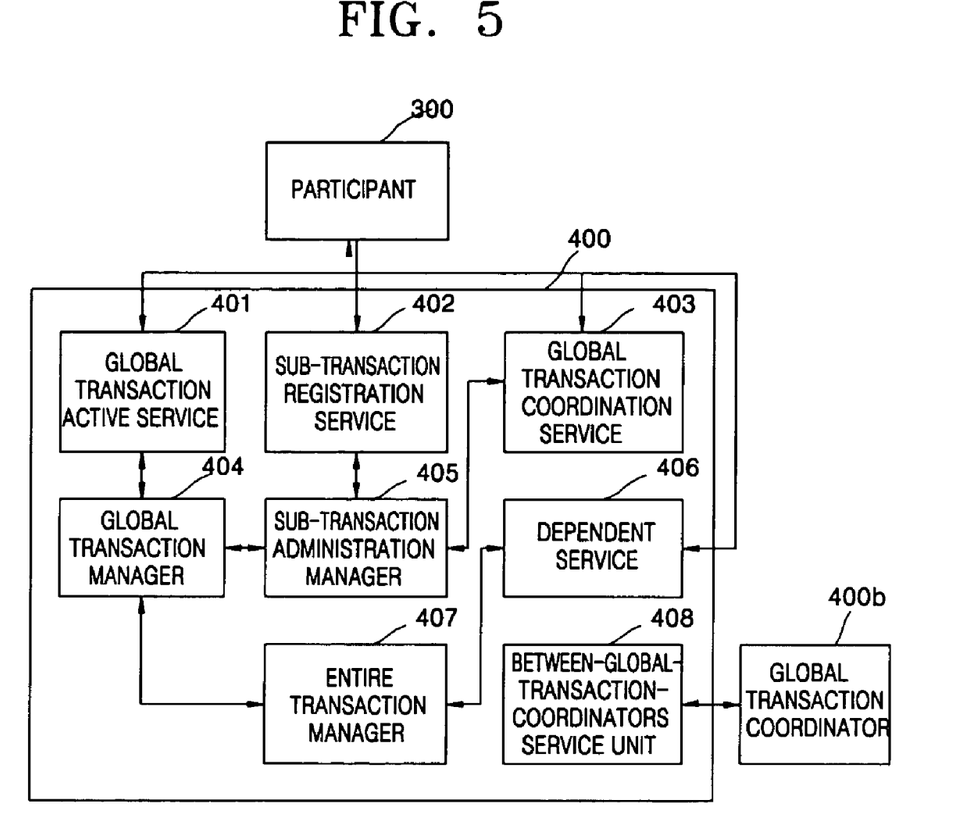
FIG. 5 is a block diagram of a detailed structure of a global transaction coordinator forming a system for aborting web services automatically according to the present invention.

FIG. 5 is a block diagram of a detailed structure of a global transaction coordinator forming a system for aborting web services automatically according to the present invention.

Referring to FIG. 5, the global transaction coordinator 400 includes a global transaction active service unit 401, a sub-transaction registration service unit 402, a global transaction coordination service unit 403, a global transaction manager 404, a sub-transaction administration manager 405, a dependency service unit 406, an entire transaction manager 407, and a between-global-transaction-coordinators service unit 408.

The global transaction active service unit 401 receives a request to generate a new global transaction object from a web service application program. The sub-transaction registration service unit 402 registers sub-transactions with a global transaction. The global transaction coordination service unit 403 is an interface for exchanging messages to coordinate sub-transactions and a global transaction. The global transaction manager 404 generates and deletes a global transaction object, and generates and deletes a coordination context containing an ID uniquely specifying the object and information on the global transaction. The sub-transaction administration manager 405 collects information on all sub-transactions belonging to a global transaction, identifies the states of the global transaction and sub-transactions, and determines the progress. The dependency service unit 406 is an interface for receiving dependency information of a global transaction by communicating with a participant. The entire transaction manager 407 stores dependency information between global transactions and manages the entire transaction. The between-global-transaction-coordinators service unit is an interface for exchanging messages between global transaction coordinators and coordinating the entire transaction.

The global transaction active service unit 401 is an interface to be used when a web service application program requests the global transaction coordinator 400B to generate a new global transaction. The global transaction active service unit 401 requests the global transaction manager 404 to generate a new global transaction object, and then, receives a coordination context as a response to the request, and transmits the coordination context to the web service application program which requests generation of the global transaction. At this time, the coordination context includes the global transaction ID that uniquely identifies the global transaction, the address of the sub-transaction registration service unit 402, and information that should be divided and owned by global transaction coordinators cooperating to coordinate the global transaction object.

The sub-transaction registration service unit 402 is an interface which is used when the participant 300 of a web service application program performing a sub-transaction requests the global transaction coordinator 400B to register the sub-transaction performed by the participant 300 as the sub-transaction of the corresponding global transaction. The sub-transaction registration service unit 402 newly generates a sub-transaction object through the sub-transaction administration manager 405, and registers this sub-transaction with a global transaction object through the global transaction manager 404. The sub-transaction administration manager 405 analyzes a registration message transmitted by the sub-transaction, and finds the ID of a global transaction to which the sub-transaction belongs, and the address of the protocol service unit 303 of the participant of the sub-transaction. Then, the sub-transaction administration manager 405 requests the global transaction manager 404 to register the sub-transaction with the global transaction object based on the global transaction ID extracted immediately before, and sets the extracted protocol service address as an address for sending a message to the participant. At this time, as a response to the sub-transaction registration service unit 402, the sub-transaction administration manager 405 informs the address of the global transaction coordination service unit 403 that is an interface for the corresponding participant to exchange messages for coordination with the global transaction manager 404. With this, the participant 300 and the global transaction coordinator 400B establish a communication channel to connect each other.

The global transaction coordination service unit 403 is an interface used by a sub-transaction to inform the global transaction coordinator 400B of the state of the sub-transaction. The global transaction coordination service 403 receives a variety of messages including 'completed', 'faulted', and 'canceled'. A message which the sub-transaction sends to the global transaction coordinator 400B can be defined in a variety of ways based on a transaction model used by the sub-transaction. The global transaction coordination service unit 403 transmits the received message to the sub-transaction administration manager 405, and the sub-transaction administration manager 405 analyzes the received message and extracts the global transaction ID and the sub-transaction ID. Then, the sub-transaction administration manager 405 finds the sub-transaction, based on the sub-transaction ID, and appropriately changes the sate of the sub-transaction object, based on the message which is received and transmitted by the global transaction coordination service unit 403. Then, since the state of the sub-transaction is changed, the sub-transaction administration manager 405 informs the global transaction manager 404 that it is necessary to change the state of the global transaction including the sub-transaction. At this time, the global transaction object including the sub-transaction is found based on the global transaction ID identified above.

The global transaction manager 404 is an element for coordinating a global transaction. The global transaction manager 404 generates a global transaction object, and determines whether to commit or abort a global transaction by changing the state of the global transaction based on the state change of sub-transactions. Meanwhile, if information from the entire transaction manager 407 indicating a global transaction whose dependent transaction is a predetermined global is received, the corresponding global transaction does not commit the global transaction even though all sub-transaction are committed, and waits until the entire transaction manager 407 sends a command to commit or abort. If a command to commit the corresponding global transaction is received, a commit operation is performed and if a command to abort is received, the global transaction is aborted by compensating all sub-transactions already committed.

The sub-transaction administration manager 405 is an element for managing all sub-transaction objects belonging to a global transaction, and shares the state information of respective sub-transactions with the participant 300.

The dependency service unit 406 is an interface for the participant 300 to transmit dependency information to the global transaction coordinator 400B. The dependency service unit 406 transmits dependency information received from the global transaction coordinator 400B, to the entire transaction manager 407 such that the information can be used to coordinate the entire transaction.

The entire transaction manager 407 is an element for manage an entire transaction, and maintains and manages information on the entire transaction. The entire transaction information managed by the entire transaction manager 407 includes information on dependent global transactions and dominant global transactions having direct dependency with the entire transaction manger 407. The entire transaction manager 407 performs two roles.

First, it manages an entire transaction. For this, when new dependency information from the dependency service unit 406 is received, the entire transaction manager 407 recognizes that it manages a dependent global transaction, and commands the global transaction manager 404 to delay to commit till a command from the dominant global transaction is received, because the global transaction is a dependent global transaction. Next, the dependent global transaction coordinator informs the dominant transaction coordinator of the dependency that the dependency occurs, and requests the dominant transaction coordinator to inform commitment or abort of the dominant global transaction when occurs. When commitment of the dominant global transaction occurs, the commitment is performed as the following method. If the dominant global transaction is not the top-layer global transaction of the entire transaction, the top-layer global transaction commits the dominant global transaction and the dominant global transaction waits till its dominant global transaction commits. Unlike this, if the dominant global transaction is the top-layer global transaction, the entire transaction manager managing this global transaction is informed by the global transaction manager of the commitment of the global transaction, and then retrieves its own dependency information, and informs the coordinator (first coordinator) of a direct dependent global transaction of the global transaction, of the commitment of the top-layer global transaction. Meanwhile, the coordinator (first coordinator) recognizes the commitment of its dominant global transaction, and then calls its entire transaction manager, and checks whether or not all dominant global transaction of the global transaction are committed. If all dominant transactions are committed, the dependent global transaction also performs a commit operation, and this global transaction also informs its dependent global transactions of its commitment.

In this manner, if all global transactions belonging to the entire transaction are committed, the commitment of the entire global transaction is performed. If the top-layer global transaction of the entire transaction is aborted, the coordinator of the top-layer global transaction informs its directly dependent global transaction coordinators of the abort, and all direct dependent global transactions are continuously aborted. Then, dependent global transactions of the dependent global transactions are also continuously aborted. Through these continuous aborts, the entire transaction is aborted.

If a middle-layer global transaction, not the top-layer global transaction, of the entire transaction is aborted, this abort affects only its directly dependent global transactions and their dependent global transactions. That is, when a middle-layer global transaction is aborted, the entire transaction manager of the corresponding global transaction coordinator divides the entire global transaction into two with the global transaction as a basis, and informs the direct dominant global transactions of the global transaction that the entire transaction is divided into two and the dependency does not exist any more. As the entire transaction is divided into two, the global transaction becomes the top-layer global transaction of the newly generated entire global transaction and is processed in the same manner as when a top-layer global transaction is aborted.

Figure 6:
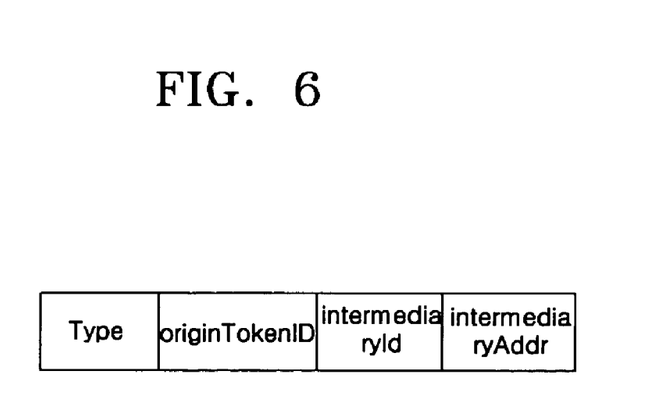
FIG. 6 is a diagram showing the structure of a token.

Secondly, the entire transaction manager 407 finds a circular dependency. Whenever dependency information from the dependency service unit is received, the entire transaction manager of a dependent global transaction coordinator generates a token to check whether this dependency causes a circular dependency, and transmits the token to the dominant global transaction coordinator of the global transaction through services between coordinators. The structure of a token is shown in FIG. 6. Referring to FIG. 6, the structure of a token will now be explained in more detail.

type: There are two types of tokens.

originID: This is a field generated by a global transaction coordinator which generates first the token, and by checking the value of this field, a global transaction coordinator determines whether the token is generated by itself.

intermediaryID: This is a unique number of a token generated when a global transaction coordinator that is located in the middle of a dependency tree, transmits a token received from its dependent global transaction coordinator, to its dominant global transaction coordinator.

intermediaryAddr: This is the address of a global transaction coordinator that is located in the middle of a dependency tree, the address generated when the coordinator transmits a token received from its dependent global transaction coordinator, to its dominant global transaction coordinator.

Two types of tokens are as follows:

circularDependencyCheck: a token which is transmitted when whether or not a circular dependency occurs is checked.

ack: a token which is transmitted as a response to circularDependencyCheck.

An algorithm to identify a circular dependency will be explained later. If the entire global transaction manger finds, by using a token, that a newly generated dependency causes a circular dependency, in order to prevent generation of a circular dependency, the entire global transaction manager aborts the dominant global transaction of the dependency generating a circular dependency.

The between-global-transaction-coordinators service unit 408 is an interface for exchanging a message between global transaction coordinators 400 and 400B. The global transaction coordinators 400 and 400B exchange dependency information, global transaction state information, sub-transaction state information, and tokens through the between-global-transaction-coordinators service unit 408.

An algorithm to identify a circular dependency will now be explained.

In order to identify a circular dependency, whenever a dependency between global transactions occur, the dependent global transaction transmits the circularDependencyCheck-type token to its dominant global transaction. The dominant global transaction coordinator receives the token, checks the originID of the token and determines whether or not it is the generator of the token. If the generator of the token is not the coordinator itself, the dominant global transaction coordinator checks whether or not the global transaction has a dominant global transaction inductively, and if there is a dominant global transaction, transmits a token to the global transaction coordinator of the dominant global transaction. At this time, the type and originID value of the token are not changed and intermediaryID and intermediaryAddre are adapted to the coordinator to generate a new token and the new token is transmitted. Also, intermediaryID and intermediaryAddr before adaptation are stored in a token table such that a response token to the token can be transmitted later. The above steps are repeatedly performed, and if a global transaction of a global transaction coordinator which receives a transmitted token does not have a dominant global transaction any more, the global transaction coordinator generates an ack-type token as a response to the received token, and transmits the dependent global transaction coordinator which transmitted the token. At this time, for the address of the dependent global transaction coordinator, intermediaryAddr written in the token is referred to.

The global transaction coordinator which receives the ack-type token, checks the originID of the token to determine whether it is the generator of the token. If the global transaction coordinator is not the generator of the token, then the global transaction coordinator is a global transaction coordinator for transfer of the token located in a middle layer. Accordingly, the global transaction coordinator checks which token that the coordinator transmitted the received token is a response to, by referring to the token table. If it receives responses to all tokens it transmitted, the global transaction coordinator transmits an ack-type token to the dependent global transaction. If the global transaction coordinator is the generator of the received token, then because it receives an ack token, the global transaction coordinator recognizes that the dependency does not cause a circular dependency.

Meanwhile, during the performance of the process to identify the generator of the token based on the originID of the token, if the global transaction coordinator checks the originID and then determines that it generated the token, the global transaction coordinator recognizes that a circular dependency occurs. Then, the global transaction coordinator commands the dominant global transaction of the dependency causing a circular dependency, to abort the transaction. The global transaction coordinator of the dominant global transaction which is to be aborted due to the circular dependency transmits an ack-type token to the dependent global transaction coordinator of the dominant global transaction, and then aborts the global transaction.

The global transaction coordinator which receives the ack-type token, checks the originID of the token to determine whether it is the generator of the token. If the global transaction coordinator is not the generator of the token, then the global transaction coordinator is a global transaction coordinator for transfer of the token located in a middle layer. Accordingly, the global transaction coordinator checks which token that the coordinator transmitted the received token is a response to, by referring to the token table. If it receives responses to all tokens it transmitted, the global transaction coordinator transmits an ack-type token to the dependent global transaction. If the global transaction coordinator is the generator of the received token, then because it receives an ack token, the global transaction coordinator recognizes that the dependency does not cause a circular dependency.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the system and method for aborting web service transactions automatically, all processes are automated such that application programmers do not need to program continuous compensation one by one. In order to perform continuous aborts, a global transaction coordinator keeps information on only a global transaction having a direct dependency with the global transaction coordinator such that business information of a predetermined company can be protected from possible exposure to other companies having no direct relations with the company. In addition, a unified interface between a global transaction coordinator and participants is provided such that all global transaction coordinators and participants implementing this interface can always be integrated to a system for automatically performing continuous aborts.

What is claimed is:

1. A method for aborting web service transactions automatically comprising:
    receiving a request to generate a new global transaction object, from a first web service application program;
    generating a global transaction object requested by the first web service application program, and transmitting a coordination context to the web service application program;
    receiving a request from a participant containing a second web service application program performing a sub-transaction, to register the sub-transaction as a lower-layer transaction of the global transaction;
    generating a sub-transaction object corresponding to a sub-transaction whose registration is requested by the participant;
    receiving the state of a sub-transaction being performed in the participant, from the participant;
    based on the state of the sub-transaction being performed in the participant received from the participant, extracting global transaction identification information and sub-transaction identification information, retrieving a sub-transaction corresponding to the extracted sub-transaction identification information, and changing the state of the sub-transaction;
    based on the state changes of the sub-transactions, changing the state of the global transaction and determining whether to commit or abort the global transaction;
    wherein the coordination context includes identification information of the global transaction, the address of the sub-transaction registration service unit, and information that should be divided and owned by global transaction coordinators cooperating to coordinate the generated global transaction object.

2. The method of claim 1, further comprising:
    storing dependency information of the global transaction received from the participant, and managing an entire transaction.

3. The method of claim 1, wherein storing dependency information and managing an entire transaction comprises:
    if new dependency information is received, recognizing a global transaction being managed, as a dependent global transaction; and
    delaying a commit operation till a command from a dominant global transaction of the dependent global transaction is received.

4. The method of claim 1, wherein in storing dependency information and managing an entire transaction, if information that a predetermined first global transaction is a dependent global transaction of a second global transaction is received, the first global transaction is not committed even when all sub-transactions are committed, and waits till a command to commit or abort the first global transaction from the entire transaction manager is received.

5. The method of claim 1, wherein in storing dependency information and managing an entire transaction, if a command to commit the first global transaction is received, the first global transaction is committed, and if a command to abort the first global transaction is received, the first global transaction is aborted by compensating all sub-transactions already committed.

6. A method for aborting web service transactions automatically comprising:
    receiving a request to generate a new global transaction object, from a first web service application program;
    generating a global transaction object requested by the first web service application program, and transmitting a coordination context to the web service application program;
    receiving a request from a participant containing a second web service application program performing a sub-transaction, to register the sub-transaction as a lower-layer transaction of the global transaction;
    generating a sub-transaction object corresponding to a sub-transaction whose registration is requested by the participant;
    receiving the state of a sub-transaction being performed in the participant, from the participant;
    based on the state of the sub-transaction being performed in the participant received from the participant, extracting global transaction identification information and sub-transaction identification information, retrieving a sub-transaction corresponding to the extracted sub-transaction identification information, and changing the state of the sub-transaction;
    based on the state changes of the sub-transactions, changing the state of the global transaction and determining whether to commit or abort the global transaction;
    transmitting and receiving messages between global transaction coordinators and coordinating an entire transaction,
    wherein storing dependency information and managing an entire transaction comprises:
    if new dependency information is received, recognizing a global transaction being managed, as a dependent global transaction; and
    generating a token to check whether or not a circular dependency occurs, and transmitting the token to a global transaction coordinator corresponding to the dominant global transaction of the dependent global transaction through a between-global-transaction-coordinators service unit.

7. The method of claim 6, wherein generating and transmitting the token comprises:
    generating a circularDependencyCheck-type token and transmitting the token to the global transaction coordinator corresponding to the dominant global transaction; and
    receiving an ack-type token transmitted by a top-layer global transaction coordinator which receives the circularDependencyCheck-type token that is transmitted in succession from the global transaction coordinator corresponding to the dominant global transaction.

8. The method of claim 7, wherein generating and transmitting the token comprises:

if it is confirmed that the global transaction coordinator corresponding to the dominant global transaction is the original generator of the token, the global transaction coordinator corresponding to the dominant global transaction commanding a dominant global transaction of a dependency generating a circular dependency, to abort; and the global transaction coordinator of the dominant global transaction which is to abort due to the circular dependency transmitting an ack-type token to the dependent global transaction coordinator of the global transaction, and then aborting the global transaction.

\* \* \* \* \*